(12) United States Patent
Melander et al.

(10) Patent No.: US 10,178,154 B2
(45) Date of Patent: Jan. 8, 2019

(54) METHOD AND SYSTEM FOR CLOUD SERVICE DEPLOYMENT

(71) Applicant: Telefonaktiebolaget L M Ericsson (publ), Stockholm (SE)

(72) Inventors: Bob Melander, Sigtuna (SE); Enrique Eduardo Fernández Casado, Solna (SE); Hareesh Puthalath, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 517 days.

(21) Appl. No.: 14/435,254

(22) PCT Filed: Oct. 23, 2012

(86) PCT No.: PCT/SE2012/051131
§ 371 (c)(1),
(2) Date: Apr. 13, 2015

(87) PCT Pub. No.: WO2014/065722
PCT Pub. Date: May 1, 2014

(65) Prior Publication Data
US 2015/0271251 A1    Sep. 24, 2015

(51) Int. Cl.
*H04L 29/08* (2006.01)
*G06F 9/50* (2006.01)
(Continued)

(52) U.S. Cl.
CPC ............ *H04L 67/10* (2013.01); *G06F 9/5072* (2013.01); *G06F 17/30864* (2013.01);
(Continued)

(58) Field of Classification Search
None
See application file for complete search history.

(56) References Cited

U.S. PATENT DOCUMENTS 8,756,322 B1 *   6/2014   Lynch ................. H04L 12/5695
                                                         709/226
9,055,067 B1 *   6/2015   Ward, Jr. ................ H04L 67/10
(Continued)

FOREIGN PATENT DOCUMENTS

CN    101438273 A    5/2009
WO    2011131211 A1  10/2011

OTHER PUBLICATIONS

Vaquero, L., et al., "A Break in the Clouds: Towards a Cloud Definition", ACM SIGCOMM Computer Communication Review, Jan. 1, 2009, pp. 50-55, vol. 39, No. 1, ACM, NY, US.
(Continued)

*Primary Examiner* — Younes Naji
(74) *Attorney, Agent, or Firm* — Coats & Bennett, PLLC

(57) ABSTRACT

The application relates to a method and a system (200) for deploying cloud services to a cloud computing network (230) where the cloud services are to be provided to mobile cloud customers. Current cloud services are not optimized to take into account cloud service customers that are mobile which results in inefficient use of the transmission resources in the network. The problem is solved by a method and a system (200) for pre-deploying the required cloud service to a feasible cloud service processing environment (211-213) that is closest to the location where the cloud customer (221-223) plans to be at a certain estimated time of arrival and duration.

16 Claims, 6 Drawing Sheets

(51) Int. Cl.
    *G06F 17/30* (2006.01)
    *H04W 4/029* (2018.01)
    *H04L 12/24* (2006.01)

(52) U.S. Cl.
    CPC .............. *H04L 67/08* (2013.01); *H04L 67/18* (2013.01); *H04L 67/34* (2013.01); *H04W 4/029* (2018.02); *H04L 41/12* (2013.01)

(56) References Cited

U.S. PATENT DOCUMENTS

| | | | | |
|---|---|---|---|---|
| 2001/0032262 | A1* | 10/2001 | Sundqvist | H04L 29/06 709/226 |
| 2003/0154112 | A1 | 8/2003 | Neiman et al. | |
| 2007/0276900 | A1* | 11/2007 | Wang | G06Q 10/06 709/203 |
| 2010/0015993 | A1 | 1/2010 | Dingler et al. | |
| 2010/0049851 | A1* | 2/2010 | Garrison | G06F 9/5061 709/226 |
| 2011/0138051 | A1 | 6/2011 | Dawson et al. | |
| 2011/0314119 | A1* | 12/2011 | Kakadia | H04L 29/12066 709/213 |
| 2012/0017165 | A1* | 1/2012 | Gardner | H04L 67/36 715/771 |
| 2013/0246208 | A1* | 9/2013 | Jain | G06F 9/50 705/26.3 |
| 2015/0006733 | A1* | 1/2015 | Khan | H04L 47/70 709/226 |

OTHER PUBLICATIONS

Viera, M., et al., "Toward Advance Resource Reservation in Mobile Grid Configurations Based on User-Centric Authentication", VIII Workshop em Clouds, May 24, 2010, pp. 101-114, retrieved on Apr. 10, 2015, retrieved from internet: sbrc2010.inf.ufrgs.br/anais/data/pdf/wcga/st03_01_wcga.pdf.

Kim, D., et al., "A Study of Cloud Mobility in a Mobile Cloud Network based on Future Internet Approach", Cloud Computing 2012: The Third International Conference of Cloud Computing, GRIDS, and Virtualization, Jul. 22, 2012, pp. 146-151, retrieved on Apr. 10, 2015, retrieved from Internet: p://www.thinkmind.org/download.php?articleid=cloud_computing_2012_7_10_20166.

Gorlach et al. "Dynamic Service Provisioning for the Cloud"; 2012 IEEE Ninth International Conference on Services Computing; IEEE Computer Society; Jun. 24, 2012; pp. 555-561; XP032223569.

* cited by examiner

METHOD AND SYSTEM FOR CLOUD SERVICE DEPLOYMENT

TECHNICAL FIELD

The application relates to a method and a system for deploying cloud services to a cloud computing network where the services are to be provided to mobile cloud customers.

BACKGROUND

Cloud computing is perceived as the technology enabling an on-demand provisioning of highly reliable virtualized resources such as compute, storage and network, which can be all-time accessed from everywhere.

Promising achievements in terms of virtualization technologies made in the last decade, which enabled data centre owners to better utilize their infrastructure have become instrumental drivers of the success we are now witnessing around cloud computing.

Cloud computing is known as a layered paradigm. Depending on the service being offered it can be referred as:

Software-as-a-Service (SaaS): Enables consumers to use applications that run on a cloud computing network.

Platform-as-a-Service (PaaS): Enables consumers to create and deploy applications that make use of the cloud computing network.

Infrastructure-as-a-Service (IaaS): Enables consumers to access processing, storage, networks and other fundamental resources in order to deploy and run arbitrary software.

Content Delivery Networks (CDNs) provide mechanisms and network infrastructure that enable service providers to improve the accessibility of their content to end-users (customers).

A key component in a CDN network is a cache that is typically located close to the end-user and is in charge of caching content, thus reducing the time to fetch that content. Another important component of a CDN is the function that finds out where a certain end-user should fetch the requested content. To determine that, the CDN will use the IP address of the end-user, apply some logic that takes into account where the CDN has the requested content cached, and then finally, redirect the client to the best located cache. CDNs are good at serving content (web pages and bulky video and audio files) but do not provide mechanisms to serve cloud service (e.g. SaaS). CDNs can be seen as smart storage boxes, servers, but which are lacking many computing capabilities.

Cloud computing on the other hand does not provide this flexibility, especially not if the cloud customers are moving around such as truck drivers, sales persons, repair men etc that are depending on mobile broadband to access its firm's cloud services.

SUMMARY

With this background it is the object of the embodiments described below to obviate at least some of the disadvantages mentioned above.

The object is achieved by a method and a system for pre-deploying the required cloud service to a feasible cloud service processing environment that is closest to the location where the cloud customer plans to be at a certain estimated time of arrival and duration.

The term cloud service processing environment is here referring to a network element such as a computer, a virtual machine within a single computer or similar that is configured to execute the cloud based service.

The requested service and planned location of the cloud customer's terminal, time of arrival and duration is determined in advance by a cloud service deployment system that is receiving reservation requests comprising this information from the cloud customer's terminal. After determining the requested service and the planned arrival time and duration, the feasible cloud service processing environments are determined. Feasible cloud service processing environments are for example those that have enough capabilities and resources to host the requested service at the planned time of arrival and duration. In addition, the location of the feasible cloud service processing environments is determined. The cloud service is then deployed by the cloud service deployment system to the feasible cloud service processing environment closest to the terminal requesting the cloud service so that the cloud customer can access the requested cloud service at the estimated time of arrival and duration. The cloud service could for example be deployed by transferring a cloud service software package (IMAGE) from the cloud service deployment system comprising executable code and configuration data to the cloud service processing environment. The cloud service software package could for example provide any of the services Software-as-a-Service (SaaS), Platform-as-a-Service (PaaS) or Infrastructure-as-a-Service (IaaS) as mentioned above.

The cloud service deployment system comprises a processor coupled to a non-transitory memory storing computer program instructions and a communication interface coupled to the processor. When the processor executes the instructions it causes the cloud service deployment system to receive cloud service reservation requests from the cloud service customer's terminal wherein the requests comprise information about which cloud service the cloud service customer plan to access and at which location and at which estimated time of arrival and duration at that location.

The cloud service deployment system is further caused to determine at least one cloud service processing environment in the cloud computing network that is feasible to have the service deployed at the estimated time of arrival and duration and to determine its location. After determining the feasible cloud service processing environments the cloud service deployment system is further caused to initiate the deployment of the cloud service to the feasible cloud service processing environment closest to the planned location of the customer's terminal so that the customer can access the cloud service at the estimated time of arrival and duration.

Among the advantages is that the user experience will be improved and that transmission resources in the cloud computing network are used more efficiently as the cloud service can be delivered from a cloud service processing environment that is close to the current location of the cloud service customer.

The embodiments will now be described in more detail and referring to accompanying drawings.

DETAILED DESCRIPTION

Figure 2:
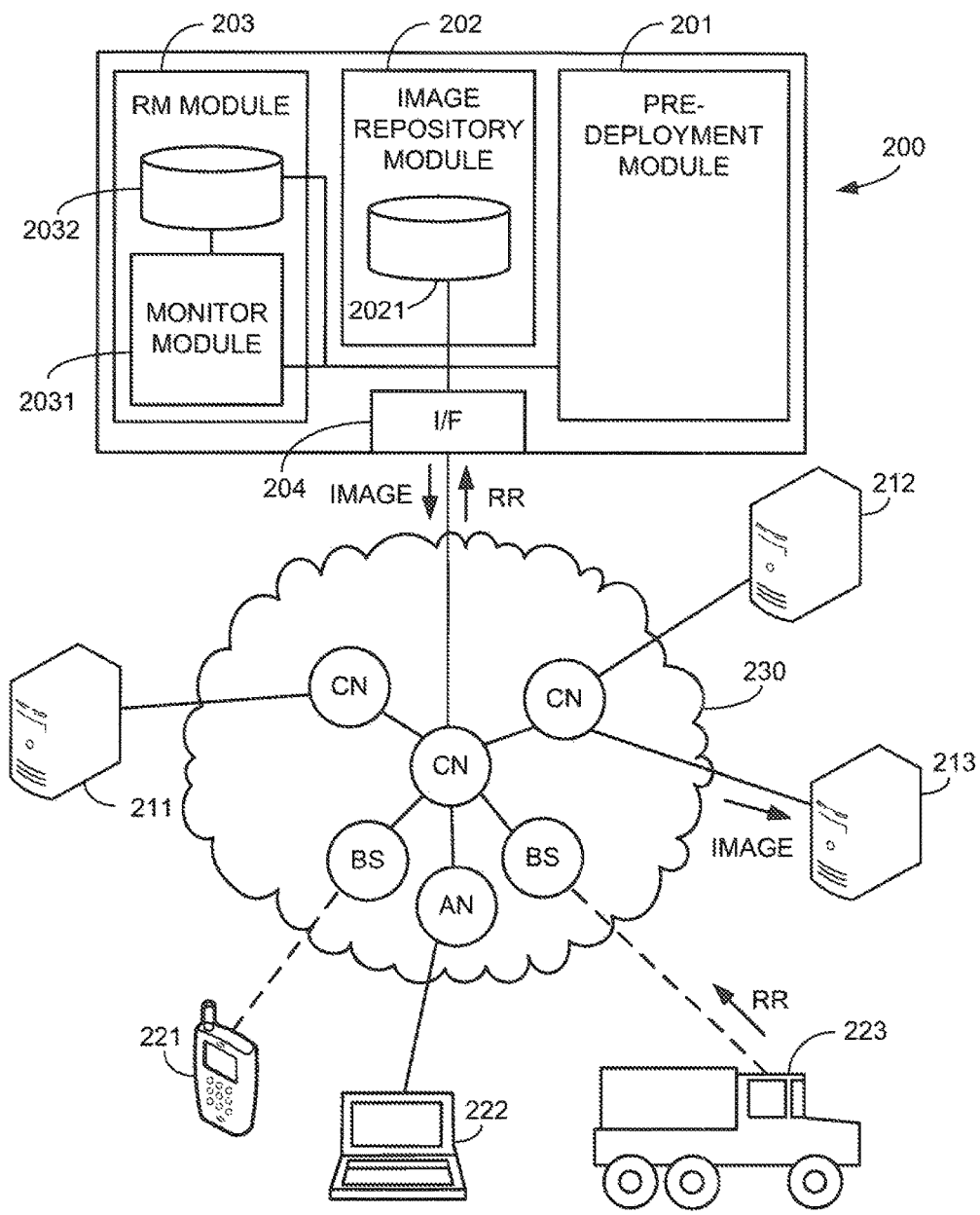
FIGS. 2 and 3 are block diagrams illustrating embodiments of a cloud service deployment system.

FIG. 2 illustrates a cloud computing network 230 including underlying communication networks such as radio or fixed access networks and core networks (not shown) with base stations BS, fixed access nodes AN and core network nodes CN respectively. The cloud computing network 230 further includes an embodiment of a cloud service deployment system 200, a plurality of terminals 221-223 belonging to mobile cloud customers and a plurality of cloud service processing environments 211-213 providing cloud services to the terminals 221-223.

The terminals 221,222,223 are mobile in the sense that they can change location but they still need access to cloud services. The terminals 221,222,223 can be wireless terminals such as smart phones, tablets, laptops, PCs etc and they can be portable or integrated in vehicles such as trucks, vans, trains etc. A typical cloud customer could for example be a truck driver that needs to access cloud services related to his/her profession from the truck 223 at different locations. But the mobile cloud customer could in principle also be a person that needs access to the same cloud service when moving his/her laptop 222 from one fixed access to another or from one WiFi hot spot to another. The cloud customer could even be a software client in the terminal working in a machine-to-machine (M2M) configuration in the cloud computing network 230.

The embodiment of the cloud service deployment system 200 illustrated in FIG. 2 comprises three functional modules, a pre-deployment module 201, an image repository module 202 and a resource management RM module 203. It also includes at least one communication interface 204 towards the underlying communication network. The RM module 203 comprises a monitor module 2031 and a resource and topology database 2032. The monitor module 2031 is configured to interrogate the cloud service processing environments 211,212,213 and to receive data about the location, capabilities, resources, workload etc and to store these data in the resource and topology database 2032. The resource and topology database 2032 is continuously updated by the monitor module 2031.

The image repository module 202 comprises an image database 2021 with copies of complete software packages (also known as virtual disks or images). Theses images could be seen as a combination of an Operating System (e.g. Linux, Windows) and the additional software packages (e.g. a CAD application, Office suite) required by the cloud customer to perform his/her everyday duties. The packages being deployed can for example offer the services earlier referred to as:

Software-as-a-Service (SaaS): Enables consumers to use applications that run on a cloud computing network.
Platform-as-a-Service (PaaS): Enables consumers to create and deploy applications that make use of the cloud computing network.
Infrastructure-as-a-Service (IaaS): Enables consumers to access processing, storage, networks and other fundamental resources in order to deploy and run arbitrary software.

The pre-deployment module 201 is basically the module that is configured to initiate a pre-deployment of cloud services to a cloud service processing environment 211,212, 213 triggered by requests RR received from the terminals 221,222,223 over the communication interface 204.

Figure 1:
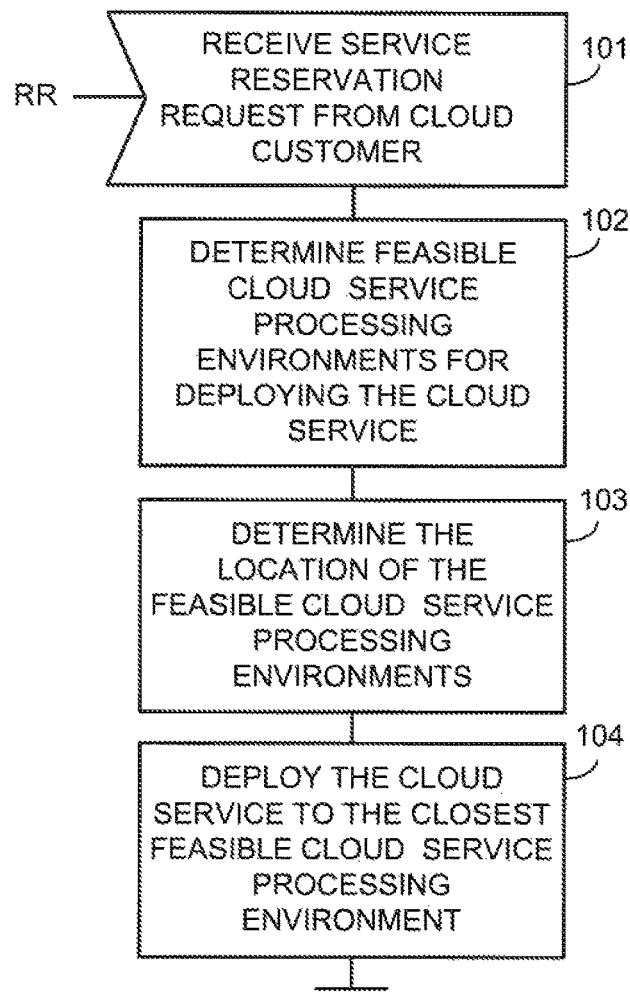
FIG. 1 is a flow chart illustrating a first embodiment of the method for deploying a cloud service to a cloud computing network.
Figure 3:
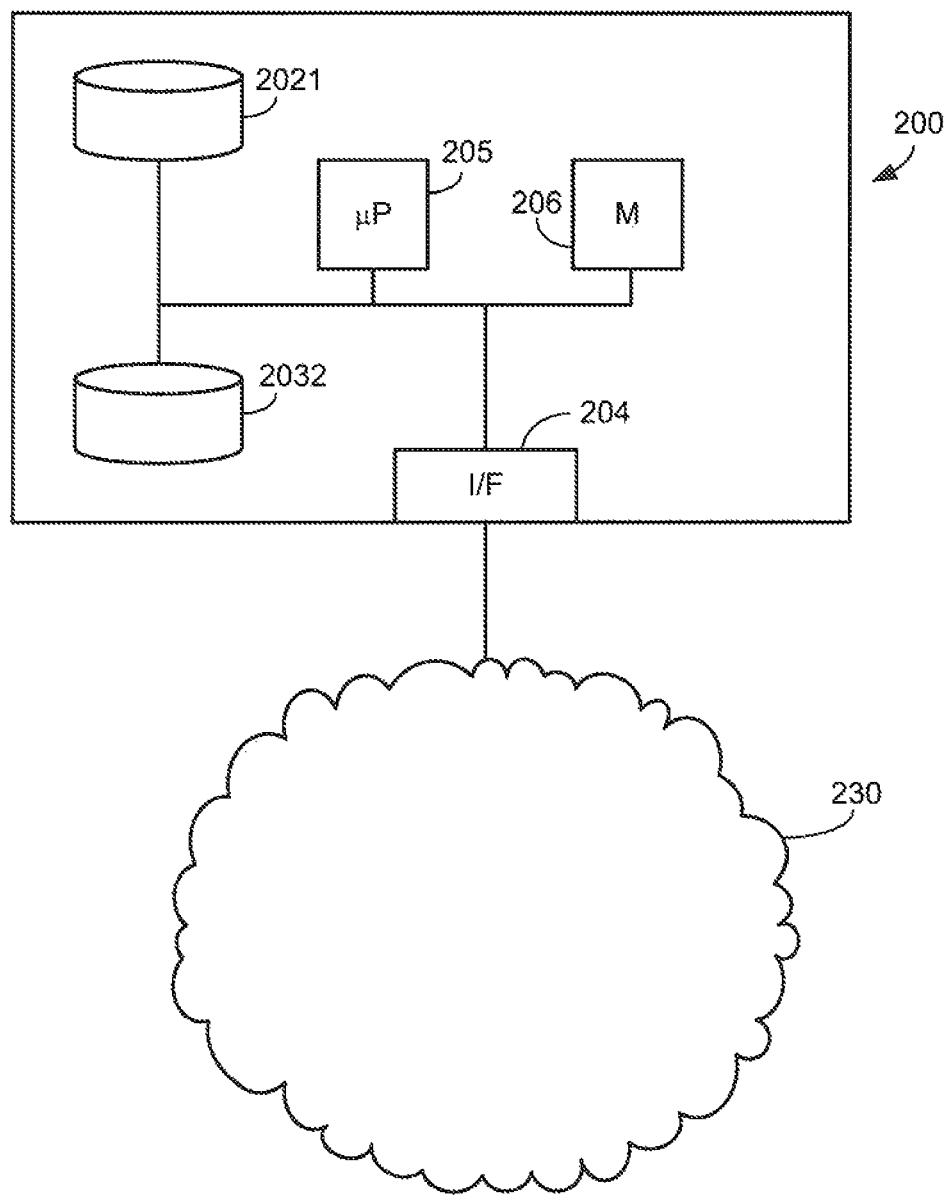

As FIG. 2 illustrates an embodiment of the cloud service deployment system 200 with its functional modules, FIG. 3 illustrates an embodiment of a hardware/software implementation of the system 200. In this embodiment, computer program instructions for all the modules 201,202,203 are stored in a non-transitory memory 206 coupled to a processor 205. The processor 205 is further coupled to the communication interface 204, the resource and topology database 2032 and the image database 2021. When the processor 205 executes the computer instructions, the cloud service deployment system 200 is in one embodiment caused to perform the steps as illustrated in FIG. 1. That is to receive in step 101 over the communication interface 204 a cloud service reservation request RR from a cloud service customer's terminal such as 223 wherein the request RR comprises information about which cloud service the cloud service customer plan to access from its terminal 223 and at which location and at which estimated time of arrival and duration at that location. In step 102 the cloud service deployment system 200 determines at least one cloud service processing environment 212,213 in the cloud computing network 230 that is feasible to have the service deployed at the estimated time of arrival and duration. In step 103 the location of each feasible cloud service processing environments 212, 213 is determined. Feasible cloud service processing environments are those that have enough capabilities and resources to host the requested service at the planned time of arrival and duration. The cloud service deployment system 200 may also estimate the time it takes to deploy the requested cloud service to the cloud service processing environments (211,212,213) and to take this into account when deploying the cloud service. In order to determine the feasible cloud service processing environment 212,213 the resource and topology database 2032 is interrogated. This database 2032 is continuously updated as will be described further below.

Finally, in step 104 the cloud service deployment system 200 is caused initiate the deployment of the cloud service to the feasible cloud service processing environment 213 closest to the planned location of the customer's terminal 223 so that the cloud customer can access the cloud service at the estimated time of arrival and duration.

Figure 4:
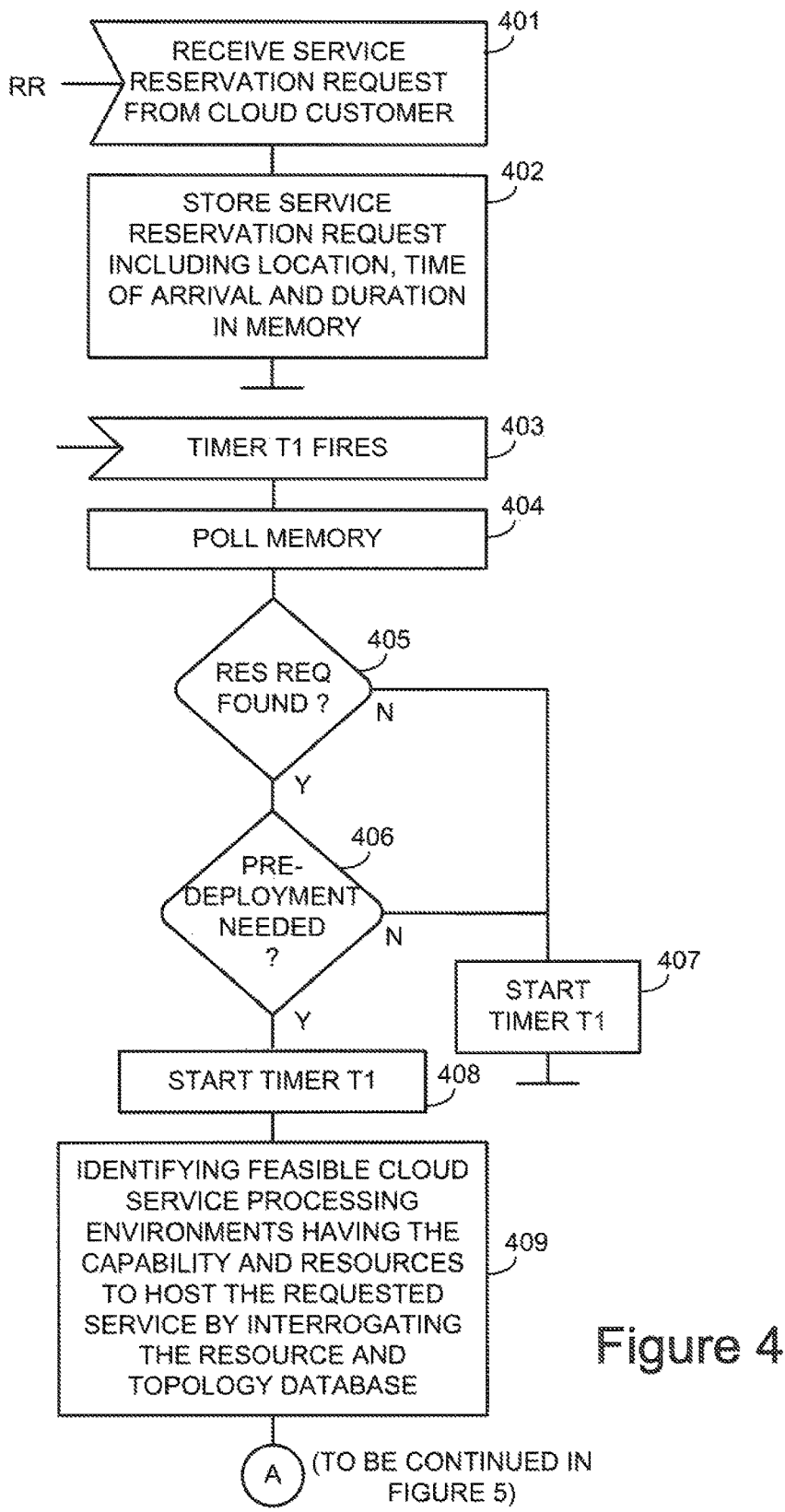
FIGS. 4 to 6 are flow charts illustrating further embodiments of the method for deploying a cloud service to a cloud computing network.

In another embodiment, illustrated in FIG. 4, the cloud service deployment system 200 receives in step 401 a cloud service reservation request RR from for example terminal 223. The received data that comprises information about which cloud service the cloud service customer plan to access from its terminal 223 and at which location and at which estimated time of arrival and duration at that location is stored in step 402 in the memory 206. The memory 206 is polled by the pre-deployment module 201 at regular intervals controlled by a timer T1. When the timer T1 fires in step 403, the memory 206 is polled in step 404 and if any stored cloud service reservation request RR is found in step 405 a check is made in step 406 by the pre-deployment module 201 if a pre-deployment is needed. If no cloud service reservation request RR is found in step 405 or if pre-deployment is not needed (the requested cloud service is for example already deployed in a cloud service processing environment near-by the terminal 223) the timer T1 is started anew in step 407 and the system 200 waits for the next poll. T1 is also restarted (for example in step 408) in order to control the next poll if it is determined that a pre-deployment is needed. The fact that a pre-deployment is needed or not is for example determined by interrogating the resource and topology database 2032.

If it is determined in step 406 that a pre-deployment is needed, the cloud service deployment system 200 is caused to interrogate in step 409 the resource and topology database 2032 in order to identify feasible cloud service processing environments 212,213. Optionally, the estimated time it takes to deploy the cloud service in the different cloud service processing environments 212,213 is determined. This parameter may be important to consider if for example the estimated time to deploy the cloud service is longer than the time for the cloud customer to arrive at a new planned location.

Figure 5:
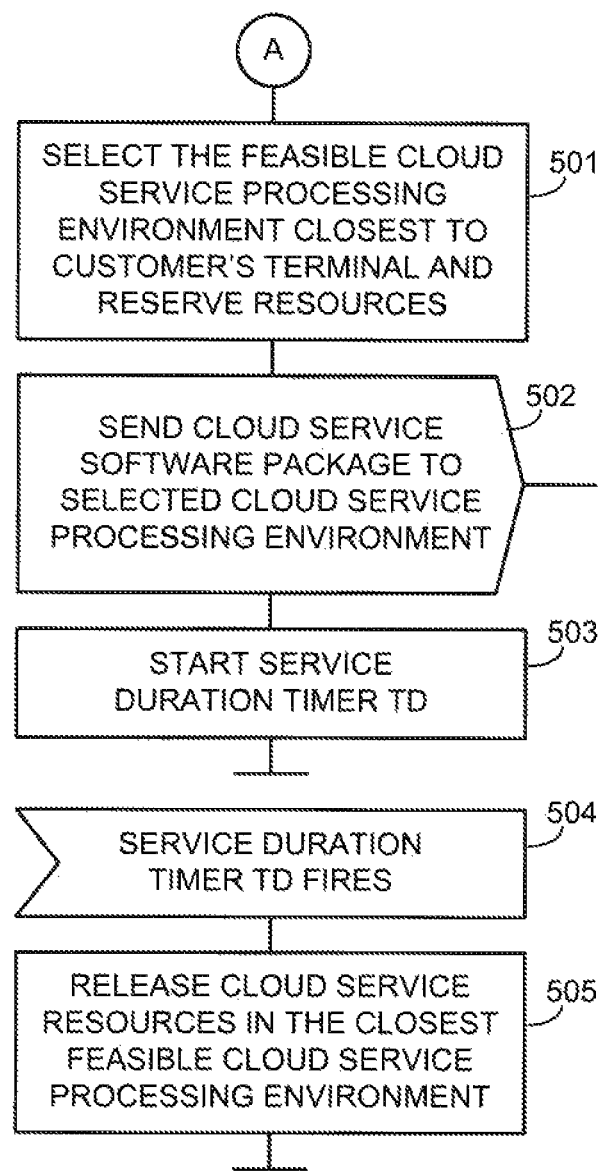

In step 501 (FIG. 5) the cloud service processing environment (e.g. 213) closest to the requesting terminal 223 is selected and resources in the selected cloud service processing environment are reserved. The term 'close' does in this context not necessarily refer to a pure geographical distance between the cloud customer's terminal 211-213 and the site where a particular cloud service processing environment 221-223 is located. It may also refer to distances with regard to costs of involved communication links between the different network elements such as air interfaces between the terminal and the base station BS, links between the access nodes AN and the core networks nodes CN etc. Different known algorithms for determining link costs can be used.

In step 502 a cloud service software package (IMAGE) comprising executable code and configuration data with the requested cloud service is fetched from the image database 2021 and sent to the closest feasible cloud processing environment 213.

The pre-deployment module 201 may also consider if for example the same cloud service is requested to be accessed by a plurality of cloud service customers at the same time or at overlapping time periods. If the cloud service costumers are planned to be located near each other, the closest feasible cloud service processing environment can be selected as described above. If the cloud service costumers have planned to be located at significantly different locations, the pre-deployment module 201 may choose pre-deploy the services to a cloud service processing environment in between the two cloud service customers' locations.

In order to avoid that unnecessary resources in the cloud service processing environments 211-213 are left unused when the cloud customer has left the service or moved to another location, a service duration timer TD is started in step 503. The value of timer TD could for example be set to a value slightly above the planned duration time for the cloud customer's terminal to be at the planned location. When timer TD fires in step 504, the resources used for the requested cloud service are released in step 505 in the cloud service processing environments 211-213.

Figure 6:
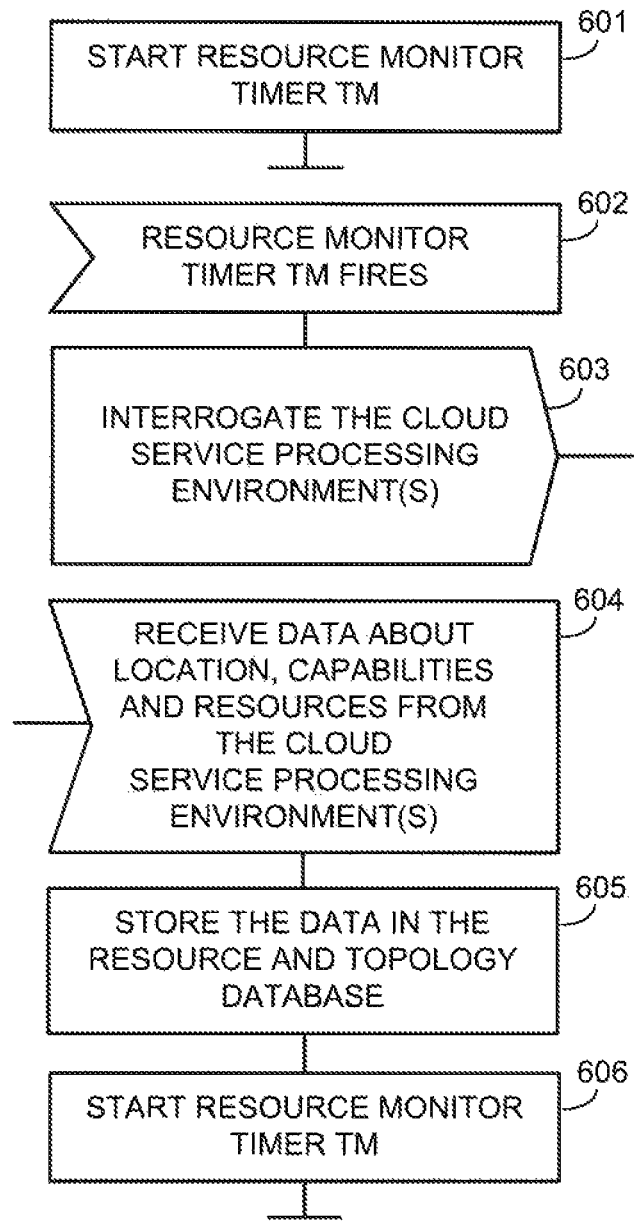

In one embodiment of the cloud service deployment system 200 as described above, the RM module 203 comprises a monitor module 2031 and a resource and topology database 2032. The monitor module 2031 is configured to interrogate the cloud service processing environments 211, 212,213 and to receive data about the location, capabilities, resources, workload etc and to store these data in the resource and topology database 2032. The resource and topology database 2032 is continuously updated by the monitor module 2031. The updates are controlled by the monitor module 2031 by starting a resource monitor timer TM as illustrated in FIG. 6, step 601. When TM fires in step 602, the cloud service processing environments 211-213 are interrogated in step 603. When the monitor module 2031 receives the data about the location, capabilities, resources, workload etc in step 604, the data is stored in the resource and topology database 2032 in step 605 and TM is restarted anew in step 606.

The invention claimed is:

1. A method, in a cloud service deployment system, for deploying a cloud service to a cloud computing network where the cloud service is to be provided to a mobile cloud service customer, the method comprising:
    receiving, at the cloud service deployment system, a cloud service reservation request from a terminal of the cloud service customer, wherein the request comprises information about a planned cloud service that the cloud service customer plans to access via the terminal, a planned location at which the customer plans the terminal to be located when accessing the planned cloud service, and an estimated time of arrival and duration that the terminal is to be located at the planned location;
    determining at least one cloud service processing environment in the cloud computing network that is feasible to have the planned cloud service deployed at the estimated time of arrival and duration;
    determining a location of the at least one cloud service processing environment;
    making the planned cloud service accessible to the terminal at the planned location and for the estimated time of arrival and duration by initiating deployment of the cloud service to a closest cloud service processing environment of the at least one cloud service processing environment that is closest to the planned location of the terminal.

2. The method of claim 1, wherein the initiating the deployment of the planned cloud service comprises transferring a cloud service software package comprising executable code and configuration data to the closest feasible cloud processing environment.

3. The method of claim 1, wherein the determining the at least one cloud service processing environment and the determining the location of the at least one cloud service processing environment comprises interrogating a resource and topology database to identify the at least one cloud service processing environment with enough capabilities and resources to host the planned cloud service at the estimated time of arrival and duration.

4. The method of claim 3, further comprising interrogating the least one cloud service processing environment and receiving location, capability, and resource data for each of the at least one cloud service processing environment, and storing these location, capability, and resource data in the resource and topology database.

5. The method of claim 1, wherein the determining the at least one cloud service processing environment comprises estimating a time it takes to deploy the planned cloud service to the at least one cloud service processing environment.

6. The method of claim 1, wherein the planned cloud service, when deployed, provides any of the following: enabling the terminal to access applications that are executable on the at least one cloud service processing environment; enabling the terminal to create and deploy applications that are executable on the at least one cloud service processing environment; enabling the terminal to access processing, storage, and other resources in the at least one cloud service processing environment in order to deploy and run arbitrary software.

7. The method of claim 1, further comprising storing any received reservation requests at reception, and polling the stored received reservation requests at regular intervals by the cloud service deployment system.

8. The method of claim 1, further comprising releasing resources in the closest feasible cloud service processing environment after the estimated time of arrival and duration has expired.

9. A cloud service deployment system for deploying a service to a cloud computing network where the cloud service is to be provided to mobile cloud service customers, the system comprising:
- a processor coupled to a non-transitory memory storing computer program instructions; and
- a communication interface coupled to the processor, wherein the program instructions are configured to, when run by the processor, cause the system to:
- receive, over the communication interface, a cloud service reservation request from a terminal of the cloud service customer, wherein the request comprises information about a planned cloud service that the cloud service customer plans to access via the terminal, a planned location at which the customer plans the terminal to be located when accessing the planned cloud service, and an estimated time of arrival and duration that the terminal is to be located at the planned location;
- determine at least one cloud service processing environment in the cloud computing network that is feasible to have the service deployed at the estimated time of arrival and duration;
- determine a location of the at least one cloud service processing environment;
- make the planned cloud service accessible to the terminal at the planned location and for the estimated time of arrival and duration by initiating deployment of the cloud service to a closest cloud service processing environment of the at least one cloud service processing environment that is closest to the planned location of the terminal.

10. The system of claim 9:
- wherein the system further comprises an image database comprising cloud service software packages comprising executable code and configuration data; and
- wherein the program instructions are further configured to, when run by the processor, cause the system to transfer a copy of a cloud service software package from the image database to the closest feasible cloud processing environment, wherein the cloud service software package corresponds to the planned cloud service.

11. The system of claim 10:
- wherein the system further comprises a topology database; and wherein the program instructions are further configured to, when run by the processor, cause the system to interrogate the topology database to identify the at least one cloud service processing environment as those cloud service processing environments having enough capabilities and resources to host the planned cloud service at the estimated time of arrival and duration.

12. The system of claim 11, wherein the program instructions are further configured to, when run by the processor, cause the system to:
interrogate the at least one cloud service processing environment receive location, capability, and resource data for each of the at least one cloud service processing environment; and store these location, capability, and resource data in the resource and topology database.

13. The system of claim 9, wherein the program instructions are further configured to, when run by the processor, cause the system to estimate a time it takes to deploy the planned cloud service to the at least one cloud service processing environment.

14. The system of claim 9, wherein the program instructions are further configured to, when run by the processor, cause the system to store any received reservation requests in the non-transitory memory and to poll the memory for stored received reservation requests at regular intervals.

15. The system of claim 9, where the planned cloud service, when deployed, provides any of the following:
- enabling the terminal to access applications that are executable on the at least one cloud service processing environment;
- enabling the terminal to create and deploy applications that are executable on the at least one cloud service processing environment;
- enabling the terminal to access processing, storage, and other resources in the at least one cloud service processing environment in order to deploy and run arbitrary software.

16. A computer program product stored in a non-transitory computer readable medium for controlling a cloud service deployment system so as to control deployment of a cloud service to a cloud computing network where the cloud service is to be provided to a mobile cloud service customer, the computer program product comprising software instructions which, when run on one or more processors of the cloud service deployment system, causes the cloud service deployment system to:
- receive, at the cloud service deployment system, a cloud service reservation request from a terminal of the cloud service customer, wherein the request comprises information about a planned cloud service that the cloud service customer plans to access via the terminal, a planned location at which the customer plans the terminal to be located when accessing the planned cloud service, and an estimated time of arrival and duration that the terminal is to be located at the planned location;
- determine at least one cloud service processing environment in the cloud computing network feasible to have the planned cloud service deployed at the estimated time of arrival and duration; determine a location of the at least one cloud service processing environment;
- make the planned cloud service accessible to the terminal at the planned location and for the estimated time of arrival and duration by initiating deployment of the cloud service to a closest cloud service processing environment of the at least one cloud service processing environment that is closest to the planned location of the terminal.

* * * * *